Figure 1:
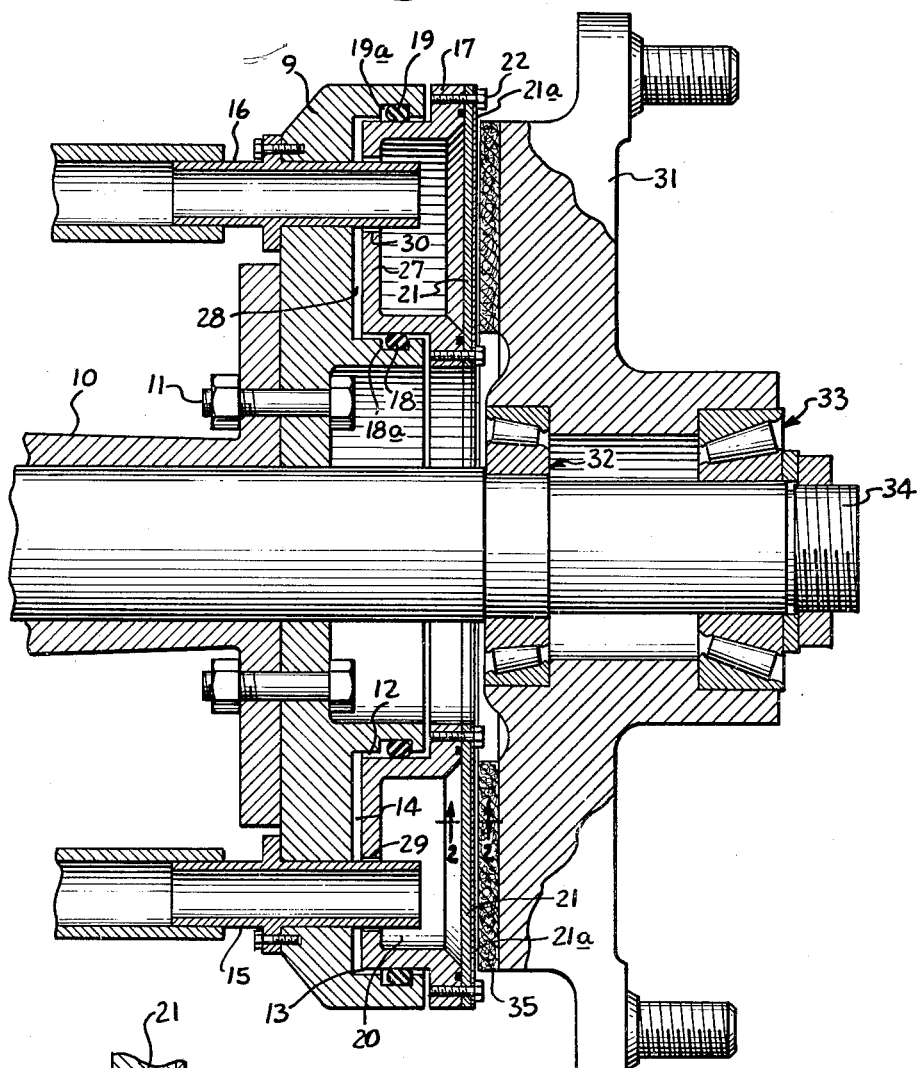

Nov. 6, 1962    C. S. BATCHELOR ETAL    3,062,348
FRICTION DEVICES
Filed Sept. 29, 1959

INVENTORS
CLYDE S. BATCHELOR
BY WARREN ROSS JENSEN
Gary, Desmond & Parker
ATTYS.

United States Patent Office

3,062,348
Patented Nov. 6, 1962

3,062,348
FRICTION DEVICES
Clyde S. Batchelor, Trumbull, and Warren Ross Jensen, Stratford, Conn., assignors to Raybestos-Manhattan, Inc., Passaic, N.J., a corporation of New Jersey
Filed Sept. 29, 1959, Ser. No. 843,293
3 Claims. (Cl. 192—113)

This invention relates to friction devices designed for retarding or arresting the motion of a vehicle or mechanism with which the device is associated, generally designated as brakes, and to friction devices designed for connecting and disconnecting at will two mechanical parts adapted for transmitting torque or power from one part to the other when the parts are connected, generally designated as clutches.

A friction mechanism of the foregoing class in general comprises a support and a pair of elements mounted for relative rotational movement thereon and for bodily movement of one toward the other, with a friction composition lining of low heat conductivity mounted on one of said elements and a mating metallic facing component of relatively high heat conductive character mounted on the other.

The metallic mating member may be provided with fluid cooling means in conventional manner, such as a chamber, for circulating cooling liquid in engagement with the rear side of the metallic member whereby higher energy dissipation at the mating surfaces can be obtained than is possible with similar devices of equal operative surface area which are not so liquid cooled.

The friction devices further may in general be of known structure such as, for example, arcuate brake shoes of the radially expanding type where, in the case of liquid cooled brakes, the composition lining is secured to the inner face of the rotatably mounted brake drum and where the shoe facings are formed of higher thermal conductivity metal, backed with a chamber for circulation of cooling liquid therethrough.

The friction devices may be of the disc type where one or more annular discs of low heat conductive composition friction material are rotatably mounted on a support adapted to be brought into surface engagement with one, or an opposed pair, of high heat conductive annular metal discs forming end closures for annular, axially shiftable chambers provided with means for circulating cooling liquid therethrough and in contact with the inner face of said metal discs, as for example in Sanford U.S. Patent No. 2,821,271.

Other examples are clutches where the driven and driving members are both rotatably mounted and are relatively axially movable for coupling, one member carrying the annular friction composition element or elements and the other comprising a liquid cooled chamber faced with an annular disc of high heat conductive metal, and retarder brakes where a liquid cooled cylinder or drum having a high thermal conductivity metal periphery is rotatably mounted on a drive shaft and is adapted to be frictionally engaged by a contracting or wrapping band lined with composition friction material, as aforesaid.

As is known, the aforesaid devices may be brought into operative or frictional engagement, in whole or in part, by mechanical means or by pressure of the cooling liquid, with the latter at atmospheric or superatmospheric pressure, and with the aid of suitable liquid and air control valves for regulating the liquid flow and pressure.

As is also known, for optimum heat transfer and energy dissipation the aforesaid high thermal conductivity metal facings should be composed of metals or alloys such as copper or silver, or their alloys or composites having a thermal conductivity of at least 40%, and preferably 60% and upwards, of that of electrolytic copper and a melting point above 1500° F. Substantially pure metal such as bus bar or electrolytic copper having an average Mohs' scale hardness of 3 has been found to be eminently suitable. Also satisfactory are alloys composed primarily of copper such as a brass of 85% copper and 15% zinc content having a melting point of 1875° F. and a thermal conductivity (32°–212° F.) of 1100 B.t.u./sq.ft./hr./° F./in. as compared with 1980° F. and 2700 respectively for electrolytic copper of 99.9% purity. Substantially pure or fine silver which has a melting point of 1760° F and a thermal conductivity of 2900 and a hardness substantially that of pure copper has been found suitable, as well as such of its alloys as sterling silver and coin silver. Silver plated copper friction elements are also suitable.

While the use of circulating liquid coolant with such metals or alloys generally prevents deleterious overheating and wear of not only the metal but also the cooperative fiber-reinforced composition friction material facing, it has been found that such is not always the case if the metal has a nonuniform surface and makes poor contact with the composition facing. In addition to any out-of-flat condition in the metal facing that may exist due to commercial manufacturing limitations, we have found that warpage of the high heat conductive metal facing often results under conditions of continual operation at high energy loadings, causing the mating components to have only local contact.

While we do not wish to be bound thereby, we believe that such warping results from unequal thermal expansion primarily because of differences in temperature in operation of the operative face of the metal member, which in severe applications can be well over 2000° F. at or very near the surface, and its liquid cooled rear face, and also differences in temperature between peripheral areas which are welded or secured, as by bolts, to the backing chamber or its flanges, and the intermediate area which contacts the composition friction material.

Distortion of the liquid cooled high heat conductive metal plate, such as for example an annular disc of copper, generally follows one of three patterns, notably a toroidal bulge which is a circumferential protuberance near the radius of gyration of the annular plate. Another form consists of miscellaneous waves or high spots without a seeming pattern. A third form consists of a substantially convex or concave shape.

It is an object of the present invention to prevent warping and scoring of friction plates composed of metal of the class hereinbefore described, as well as undue wear of the mating fiber-reinforced composition friction element.

We have found, in accordance with the present invention, that the aforesaid deficiencies may be overcome by metallically bonding a thin veneer of metal, such as chromium, nickel, steel, molybdenum and other metals and alloys melting above 2000° F. i.e., having a melting point and hardness which is higher, and a coefficient of expansion which is lower than the operative face of the relatively high heat conductive metal facing previously described. These veneer metals also inherently have lower thermal conductivity than the metal base plate.

While the use of such layer of metal acts as a heat barrier and limits its practical operative thickness to about 0.020 inch, such veneer has been found to compensate for tendency of the base plate to warp so that the friction track of the resulting composite will remain substantially flat and reduce the wear of the mating composition friction facing in many instances up to tenfold. While one would expect a tremendous heat barrier or insulator when, for example, a cooled copper friction plate is faced with another material of greatly reduced heat conductance such as chromium which has very roughly but ⅛ of the heat conductance of pure copper, it must be understood that tremendous temperatures are generated in the so-called "friction film" during frictional engagements and these high temperature heads cause very efficient transfer of the heat through the low conducting metal to the high conducting copper backing.

Thus, for the purpose of illustration and not limitation, a copper-faced liquid cooled disc brake operating against a composition friction disc composed of asbestos fiber-reinforced hardened organic binder and friction material fillers of conventional character, and wherein a ⅛ inch thick copper friction track was electroplated with chromium by the industrial or hard chrome plating process to a thickness of approximately .005 inch, was dragged for 100 hours at 40 horsepower total, equivalent to .67 horsepower/sq.in. or 0.5 B.t.u./sq.in./sec. continuous input. During this time the friction track remained dead flat, and the wear on the composition facing diminished from .0008 inch per hour at the start to .00014 inch at 100 hours in a uniform drop as contact became better.

It is believed that this excellent result was due to an expansion balance maintained between the hot friction track and the relatively cooler underlying surface of the copper which does not expand fully, which can be demonstrated as follows: The chromium plate had a coefficient of thermal expansion of approximately $4.5 \times 10^{-6}$ in./in./° F. (32-212° F.), whereas that of the copper was $9.0 \times 10^{-6}$ in./in./° F. In the indicated operation there was a pronounced difference between the surface temperature and the temperature at the metal junction line 0.004 inch beneath the operative surface. Thus with a surface temperature of 600° F. and a bond line temperature of 300° F. (each above room temperature), the composite unit is in perfect thermal balance since the expansion on the surface of the chromium would be identical to that at the surface of the copper base where it meets the chromium ($4.5 \times 600°$ F.$=9.0 \times 300°$ F.).

As a further example the copper friction track was electro-plated with bright nickel to a thickness of .005". It was then tested by dragging for 20 hours at 20 horsepower total which is equivalent to .67 horsepower per square inch or about .05 B.t.u. per sq.in./sec. continuous input. The cooled friction element remained flat and the average wear for the test was at .0004 in./hr. on the composition friction facing. The overall thickness of the copper-nickel element was .125 inch thick.

As a further example a steel clad cooled copper pressure plate was prepared by silver soldering .005 inch thick SAE 1010 steel to a copper backing material producing a structure with an overall thickness of .1875 inch. A test was run on this material in exact accord with the procedure used in testing the nickel plate. At the end of the 20 hour test period the wear of the composition friction material was .0007 in./hr. There was no measurable wear on the steel faced copper but it was faintly waved.

In the case of nickel plating, only approximate thermal expansion balance is obtained. Nickel has a coefficient of expansion of .0000074 in./in./° F. Chromium has a thermal conductivity of but .16 whereas nickel has a thermal conductivity of .22. This 30% increase in conductivity lowers the surface temperature to about 500° F. and raises the bond line temperature to about 325° F. as compared to 600° F. and 300° F. for .005 inch chromium plated copper. Thus $7.4 \times 500°$ F.$=9.0 \times 325°$ F. shows that nickel would produce a stress imbalance, but of minor magnitude.

It will thus be obvious that perfect thermal expansion balance cannot always be obtained, but using a veneer of lower expanding metal in the friction track than the underlying metal will always tend to relieve stress imbalance. It should be noted that in frictional operation, the temperature gradient line is not linear as in "steady state" heat application (boiler), but increases asymptotically as it nears the friction track.

Although veneers of as low as .002-inch thickness of the relatively hard, high melting, low coefficient of expansion metal or alloy, as compared to copper, are useful, their relatively lower thermal conductivity limits their practical thickness to about .020 in the case of chromium, and about .010 in the case of steel and nickel. Ultimate heat transfer is also related to such thickness and its coefficient of heat transfer, the minimum being about 300 B.t.u./hr./sq. ft./° F./inch (32-212° F.), and the higher the heat transfer the better. In order to effectively compensate for the relatively high coefficient of thermal expansion of the underlying metal the friction track veneer metal coefficient should be relatively low, such as in a range under .0000075 inch per ° F. per inch, with a bottom of .0000020-30.

Figure 2:
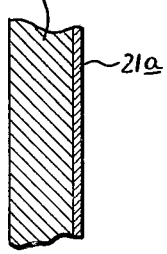

FIG. 1 of the accompanying drawings is a sectional view of a liquid cooled disc brake actuator embodying the present invention, and FIG. 2 is an enlarged partial sectional view of the composite metal friction element of the present invention.

Referring to the drawings, the brake actuator comprises an expansible chamber which includes an annular cylinder 9 secured against rotation to an axle housing 10 by means of bolts 11. The annular cylinder has inner and outer walls 12 and 13 concentric with the axis of the axle housing, the cylinder being open at the right end and closed at the left end by a wall 14 integral with the cylinder walls. Inlet and outlet conduits 15 and 16 are secured to the wall 14 and extend therethrough and into the interior of the cylinder as shown. A rigid annular piston 17 is mounted in the cylinder for sliding movement axially thereof on a resilient sealing ring 18 positioned in groove 18a in the inner cylinder wall and a resilient sealing ring 19 positioned in groove 19a in the outer cylinder wall, the rings being compressed between the bottoms of the grooves and the corresponding piston walls in sliding frictional engagement with the latter. The piston 17 has an open ended annular channel or chamber 20 for circulation of a cooling liquid, and the channel is closed at the right end by a separate, relatively thin, flat and flexible friction plate 21 of metal having a high heat conductivity supporting a relatively thin metallically bonded metal veneer friction track component 21a of relatively higher melting point, greater hardness, lower thermal conductivity and lower coefficient of thermal expansion than said plate or wall portion 21, and secured at its inner and outer peripheries to the end of the rigid piston as by means of cap screws 22. The friction plate 21—21a forms a part of the piston and moves bodily therewith being a pressure responsive member carried by the piston. This construction permits the braking torque to be transmitted from the thin friction plate to the rigid piston through the peripheral portions secured thereto as above described, and the torque is transmitted to the cylinder and axle housing by means to be described in detail hereinafter. The piston has a back wall 27, which forms in connection with cylinder 9, an annular chamber 28. Enlarged apertures 29 and 30, through which conduits 15 and 16 pass, serve to connect piston channel 20 and chamber 28. The piston is prevented from rotating in the cylinder by suitable means.

A wheel 31 is rotatably mounted by means of bearings 32 and 33 on an axle tube 34 carried by axle housing 10, the bearings serving to prevent movement of the wheel axially of the shaft in either direction. An annular friction ring 35 is adhesively or otherwise secured to the wheel for rotation therewith as shown, and positioned for engagement by the friction track 21a on movement of the piston 17 to the right.

The composition of the ring 35 is preferably such as to possess relatively low heat transfer qualities. In general, such compositions are composed of asbestos and/or cellulose reinforcing fibres combined with conventional friction modifying and augmenting materials and a heat hardenable or curable organic binder material such as thermal setting resin, i.e., a phenol formaldehyde referred to herein as composition friction materials.

The supporting high heat conductive metal plate 21 is limited in thickness only to that which provides structural soundness, wear requirements or strength adequate to provide a uniform surface. Thus, a copper plate of from about 3/32 to about 3/16 and preferably 1/8 inch in thickness is generally adequate.

The veneer metal 21a, previously described may be applied to the base plate 21 in various known manners. Thus, for example, chromium, nickel, or molybdenum can be electroplated to desired thickness onto a copper plate. A layer of steel may be cast onto a copper plate or vice versa, or for example sheets of steel and copper may be rolled together in what is known as "cladding." Other means of obtaining an intimate metallic bond include fusion, brazing, bronzing, metal spraying, silver soldering, lead-tin soldering, etc.

Although we have described our invention with respect to liquid cooled metal friction plate members, we do not wish to be limited thereto since the present invention is also applicable to use with air cooled metal friction plate members of the class hereinbefore described.

We claim:

1. A composite friction element comprising a structural member having a chamber for cooling liquid therein with at least one wall portion of said chamber formed primarily of high heat conductive metal selected from the group consisting of silver, copper and alloys of said metals having a melting point of at least 1500° F. and a thermal conductivity at least 40% of that of pure electrolytic copper, and a metallic friction track facing member metallically bonded to the outer surface of said one wall portion and consisting essentially of metal having a higher melting point, greater hardness, lower thermal conductivity and lower coefficient of thermal expansion than said wall portion, said friction track component having a thickness of less than about .020 inch, the inner surface of said high heat conductive metal wall portion being exposed for direct contact with said cooling liquid.

2. The structure of claim 1 wherein the friction track component has a thickness of from about .002 to about .010 inch.

3. The structure of claim 1 wherein the high heat conductive structural wall portion has a thickness of from about 3/32 to about 3/16 inch.

References Cited in the file of this patent

UNITED STATES PATENTS

| | | |
|---|---|---|
| 1,519,417 | Payne | Dec. 16, 1924 |
| 2,359,361 | Gleszer | Oct. 3, 1944 |
| 2,381,941 | Willman et al. | Aug. 14, 1945 |
| 2,719,438 | Schiefer | Oct. 4, 1955 |
| 2,889,897 | Sanford et al. | June 9, 1959 |
| 2,925,896 | Jaeschke | Feb. 23, 1960 |
| 2,940,556 | Jensen et al. | June 14, 1960 |

FOREIGN PATENTS

| | | |
|---|---|---|
| 677,144 | Great Britain | Aug. 13, 1952 |